(No Model.)    5 Sheets—Sheet 1.

D. LUBIN.
CLOD CRUSHER AND PULVERIZER.

No. 357,152.    Patented Feb. 1, 1887.

Witnesses,
Geo. H. Strong
J. H. Rouse

Inventor,
David Lubin
By A. H. Evans & Co.
attys (No Model.)　　　　　　　　D. LUBIN.　　　　　5 Sheets—Sheet 2.
CLOD CRUSHER AND PULVERIZER.
No. 357,152.　　　　　　　　　　Patented Feb. 1, 1887.
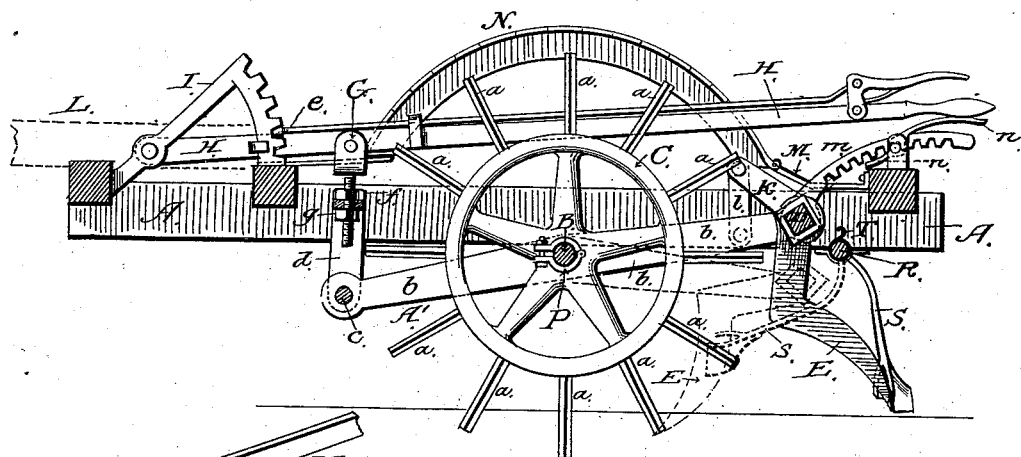
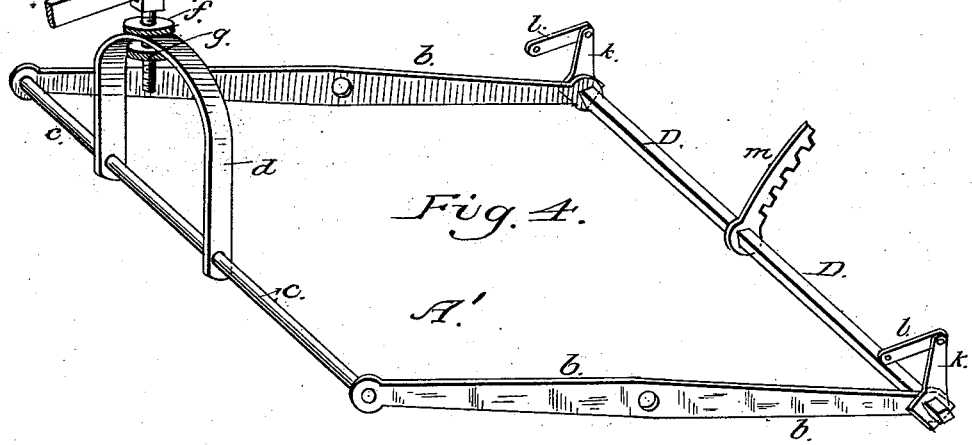
Witnesses　　　　　　　　　　　　　　　　　　　Inventor
T. Walter Fowler,　　　　　　　　　　　　　　　David Lubin
W. H. Patterson　　　　　　By his Attorneys.
　　　　　　　　　　　　　　　　A. H. Evans & Co.

(No Model.) 5 Sheets—Sheet 3.
D. LUBIN.
CLOD CRUSHER AND PULVERIZER.

No. 357,152. Patented Feb. 1, 1887.

Witnesses,
Geo. H. Strong.

Inventor,
David Lubin
By A. H. Evans & Co.
Attys (No Model.) 5 Sheets—Sheet 4.

D. LUBIN.
CLOD CRUSHER AND PULVERIZER.

No. 357,152. Patented Feb. 1, 1887.

Witnesses
T. Walter Fowler,
W. H. Patterson

Inventor
David Lubin
By his Attorneys
N. W. Evans & Co.

(No Model.) 5 Sheets—Sheet 5.

D. LUBIN.
CLOD CRUSHER AND PULVERIZER.

No. 357,152. Patented Feb. 1, 1887.

Witnesses
T. Walter Fowler
W. H. Patterson

Inventor
David Lubin
By his Attorneys
A. H. Evans & Co.

UNITED STATES PATENT OFFICE.

DAVID LUBIN, OF SACRAMENTO, CALIFORNIA, ASSIGNOR OF TWO-THIRDS TO HARRIS WEINSTOCK AND ALBERT BONNHEIM, BOTH OF SAME PLACE.

CLOD CRUSHER AND PULVERIZER.

SPECIFICATION forming part of Letters Patent No. 357,152, dated February 1, 1887.

Application filed November 30, 1886. Serial No. 220,225. (No model.)

*To all whom it may concern:*

Be it known that I, DAVID LUBIN, a citizen of the United States, residing at Sacramento, in the county of Sacramento and State of California, have invented certain new and useful Improvements in Clod Crushers and Pulverizers, of which the following is a full and clear description, reference being had to the accompanying drawings, forming part of this specification, in which—

Figure 1:
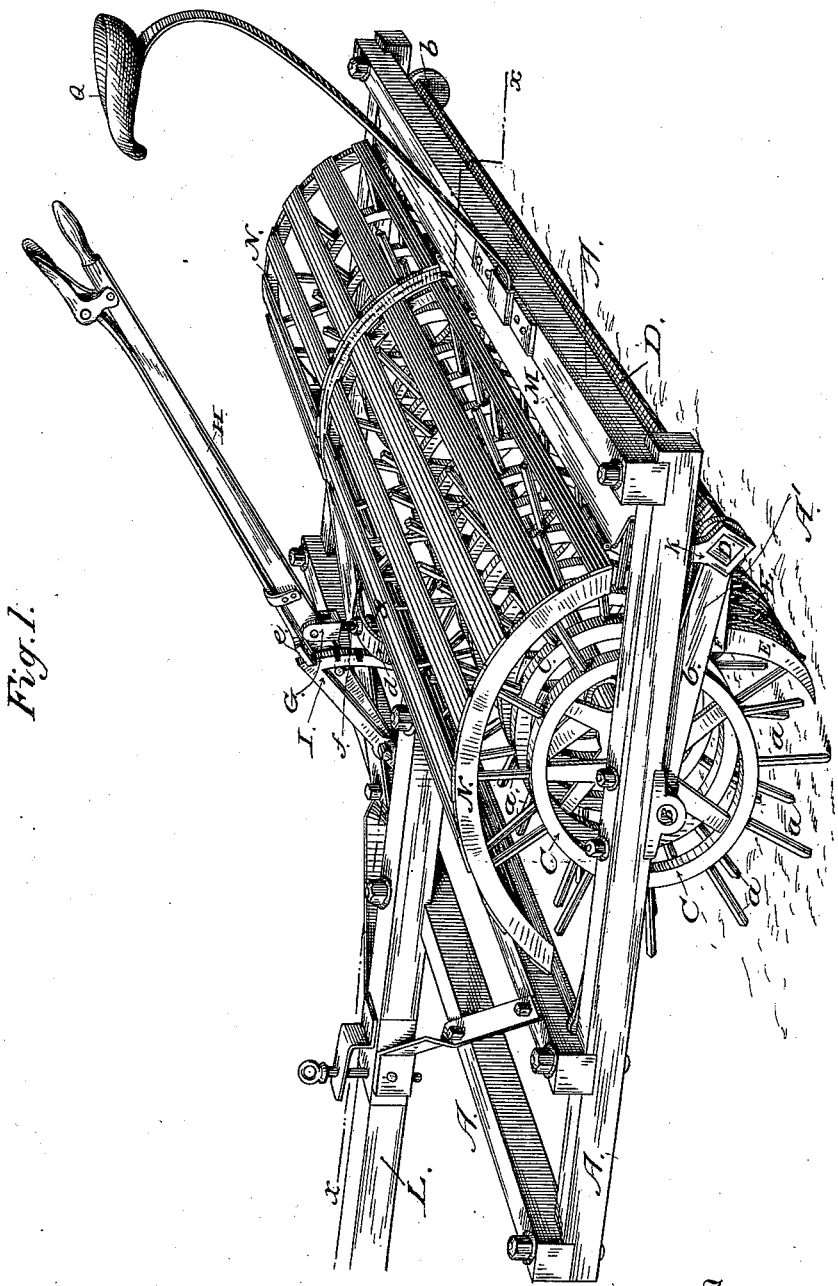
Figure 3:
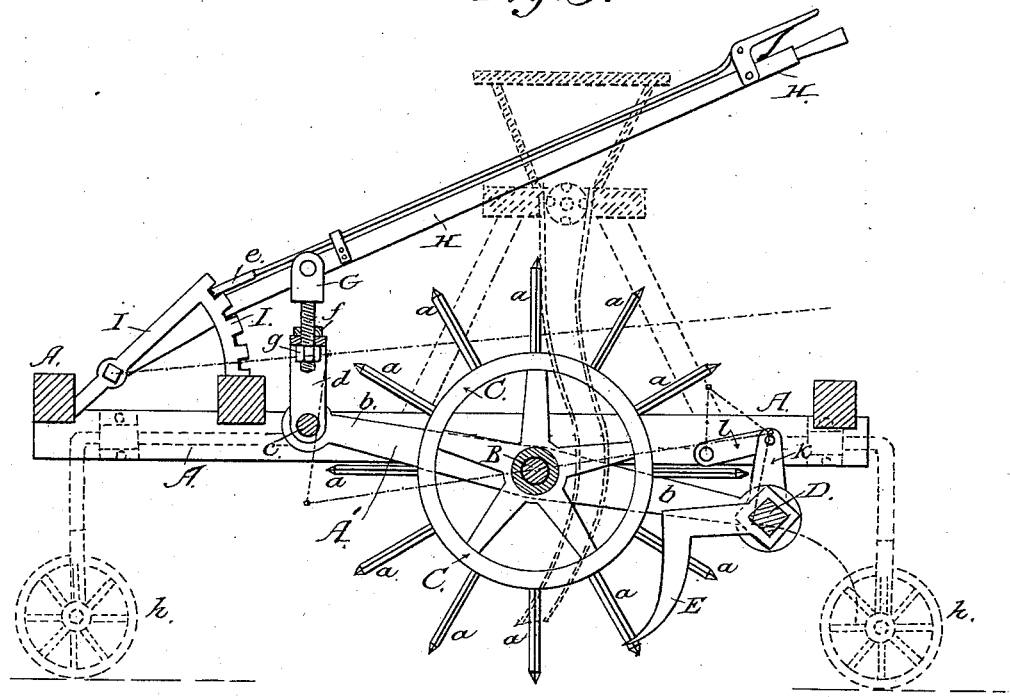
Figure 5:
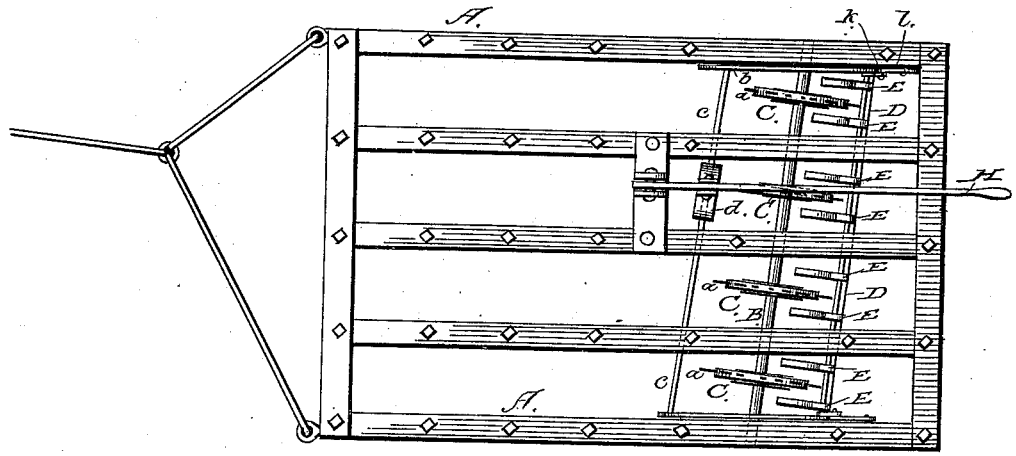
Figure 6:
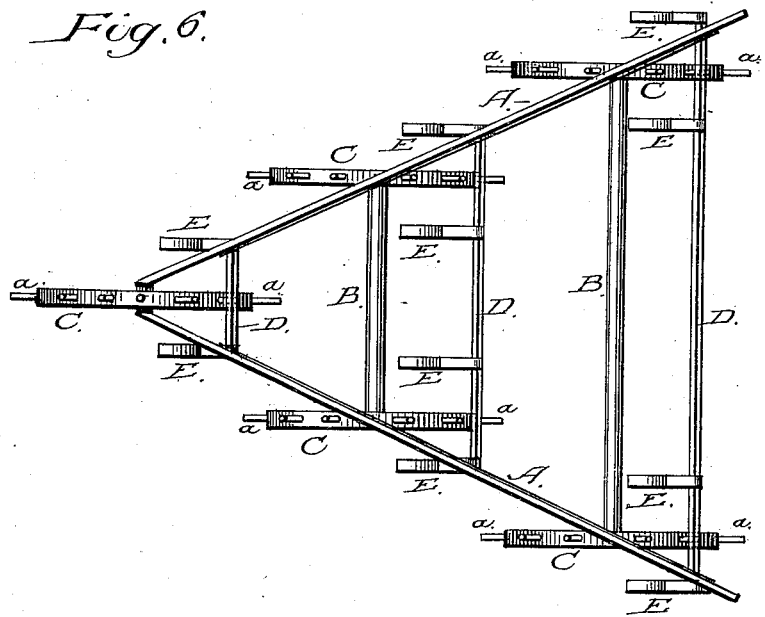
Figure 7:
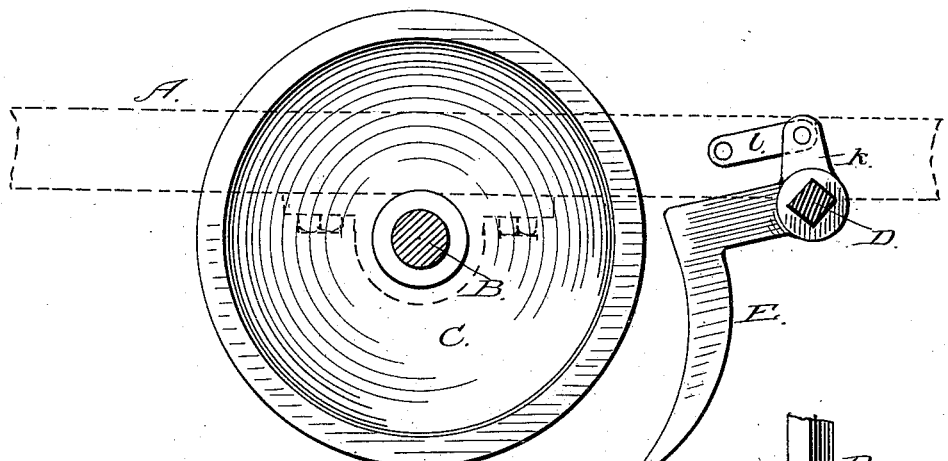
Figure 8:
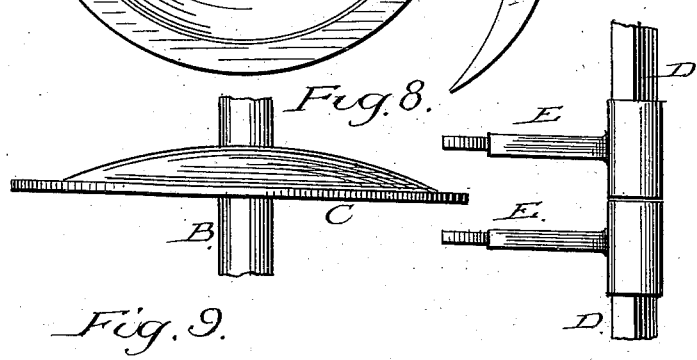
Figure 9:
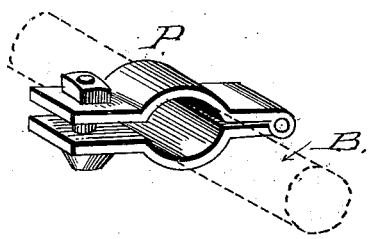

Figure 1 is a perspective view of a clod crusher and pulverizer embodying my improvements. Fig. 2 is a sectional view of the same on the line X X of Fig. 1. Fig. 3 is a similar view showing the series of fingers or crushing-bars adjusted close to the inner ends of the teeth or projections on the wheels or disks. Fig. 4 is a detail showing the arrangement of levers for adjusting said fingers. Fig. 5 illustrates my improvements applied to an ordinary harrow. Fig. 6 illustrates the same applied to a cultivator. Figs. 7, 8, and 9 are details to be referred to.

My present invention relates to clod crushers and pulverizers, and is an improvement on my application, Serial No. 219,322, filed November 18, 1886, for an improvement on harrows; and it consists in the peculiar construction and combination of devices which I shall hereinafter fully describe and claim.

To enable others skilled in the art to which my invention appertains, I will now describe its construction and indicate the manner in which the same is carried out.

In the said drawings, A represents a suitable frame adapted to support the working portions of my machine. A transverse shaft, B, is fixed within the frame A, and is provided with a series of wheels or disks, C, having teeth or projections a, which sink into the ground, and by contact therewith rotate said wheels or disks. A second shaft or bar, D, located either in front or rear of the wheels or disks, but preferably in the rear, as shown, is provided with a series of fingers or crushing-bars, E, which are designed to enter the ground and lift up the earth, and especially clods, which it may be desired to crush more completely by the action of the rotary wheels or disks. The ends of the shaft or bar D are mounted in the rear ends of arms b, pivoted upon the shaft B, while their front ends are connected together by a rod or bar, c, extending transversely across the machine and supporting the main portions of the mechanism for adjusting the series of crushing fingers or bars with relation to the wheels or disks, whereby the distance between said fingers and wheels is increased or diminished to provide for clods of different sizes. In other words, when the machine is designed for crushing the ground so as to leave clods of medium size, as for summer fallow lands for grain, the adjusting mechanism hereinafter described will be operated to throw the crushing fingers or bars from the inner ends of the teeth or projections on the wheels or disks, as shown in Fig. 2; but when it is desired to thoroughly pulverize the ground, as for orchard or vineyard lands, the same adjusting mechanism is operated to bring the fingers or bars nearer the wheels or inner ends of the teeth or projections, as shown in Fig. 3.

The fingers or crushing-bars E are of such construction and are arranged in such relation to the projections or teeth on the wheels or disks that their upper portions are inclined slightly toward the peripheries proper of the wheels, thereby contracting the space between the said wheels and fingers or crushing-bars. When the clods are first brought into contact with the front or points of the teeth, those portions of said clods projecting beyond the sides of each tooth are severed from the main body of the clod, the latter portion being carried upward by the teeth onto the crushing fingers or bars, the space between the inner ends of the teeth and the inner faces of the fingers being of gradually decreasing diameter. Therefore as the clod is carried upward by the rotary movement of the wheels or disks it is manifest a gradually-increasing pressure is brought to bear upon it, the pressure increasing until the narrowest space at the upper end of the fingers is reached, at which point the pressure will be found sufficient to crush a clod of more than ordinary solidity or toughness. If an incompressible object is carried onto the fingers by the teeth, and the operator finds that certain of his series of wheels or disks are locked by reason of such obstruction, he adjusts his operating mechanism and throws the fingers far enough from the teeth on the wheels or disks to cause the obstacle to disengage itself from the teeth and fall to the ground.

The mechanism for carrying out these several features is clearly illustrated in the drawings, and comprises the following features: On the transverse bar or rod c, which unites the forward ends of the arms or levers b with each other, is an arch or yoke, d, having a perforation in its top, through which the threaded shank of a standard or post, G, is passed and secured. The upper end of the post G is bifurcated to receive the operating-lever H, which is pivoted therein and provided with a pawl, e, adapted to engage any one of a series of notches formed in a rack, I, secured to the frame A of the machine. The operating-lever H is pivoted to or near the rack, so that its pawl e may readily engage the same, and the threaded stem of the standard or post G is provided with adjusting-nuts f and g, one of which is located upon each side of the arched plate d, as shown in Figs. 2 and 3, and by their adjustment regulate the depth which the fingers or crushing-bars penetrate the ground. In other words, if the nuts f and g are adjusted toward the top of the standard or post G, the forward part of the frame A', formed by the arms or levers b, the rod or bar c, and the shaft D, is elevated or brought nearer the operating-lever H, while the rear ends of the frame which carries the fingers or crushing-bars are correspondingly depressed, thereby lowering said fingers or crushing-bars and causing them to penetrate the ground to a greater depth. If the nuts f and g are turned so that they engage the lower portion of the threaded standard or post G, the forward end of the pivoted frame A' is lowered, thereby elevating the rear end and lifting the fingers so that they do not penetrate the ground to any considerable extent, or, in fact, may be raised entirely out of the ground, the depth of penetration being determined by the simple adjustment of the nuts f and g and their connections, and afterward maintained by the pawl and rack before described. By this construction the operator is enabled to regulate and control the depth which the fingers or crushing-bars enter the earth, and may instantly vary the same to suit the different conditions of the soil.

It may be necessary at times, owing to the soft or loose condition of the earth, to support the machine upon wheels—such as the caster-wheels h shown in Fig. 3—said wheels being located at the corners of the frame A and connected by any well-known means, so that by the operation of a lever (not shown) they may be elevated or thrown out of engagement with the ground when desired. These wheels are also of great advantage in supporting the machine when going to and returning from the field, for in proportion as the power and strain are removed from the working parts of the machine the life of the same is prolonged, while they regulate the depth at which the teeth or wheels penetrate soft or wet land.

At each end of the shaft D is a crank-arm, k, which is pivotally connected to a link, l, that is in turn pivoted to the inner sides of the frame A. The link l extends approximately at right angles to the crank-arm k when the machine is in the position shown in Fig. 3, and firmly locks the series of fingers or crushing-bars, for as the pressure is brought directly against the working-face of the fingers or crushing-bars it is transmitted to the crank-arms k, and as these arms are at right angles to the links l the movement of each of the crank-arms will be in a line nearly or quite parallel with its adjacent link. Therefore the position of the latter will not be changed, the series of fingers and the entire frame A' remaining in a rigid or locked condition until the operator grasps the lever H and, slightly moving the same, releases the parts and practically converts the frame A' from a rigid to a flexible frame.

The above-described manner of connecting the frame A', carrying the shaft D and fingers or crushing-bars E, with the main frame of the machine constitutes what may be termed a "toggle-joint" connection, and as the operating-lever is connected to the forward part of said frame A' it is manifest that the movement of said lever is communicated directly to the arms b. As these arms oscillate the movement of the rear ends is transmitted to the links l, which in their movement describe arcs of circles, thereby drawing upon the crank-arms k to cause a slight rotary movement of the shaft D and a consequent adjustment of the fingers or crushing-bars from the wheels or disks, to provide for crushing large clods, for releasing an incompressible object lodged between the fingers and teeth a, or for clearing the fingers from the weeds or rubbish adhering thereto. The depression of the lever acts to throw the crushing bars or fingers upward and backward, and the raising it again brings them back to first position. This double movement is peculiar, from the fact that the first movement of raising the fingers raises them a short distance nearly straight up, after which, by reason of the change of position of the two centers of support, they are thrown backward, as before described. When they come to be thrown down into the ground, the first movement will be to bring them forward to nearly their proper position, and the latter portion of the movement forces them directly downward into the ground.

In order that the shaft D may be securely braced against the upward strain naturally brought upon it when the machine is in operation, I may employ a connection comprising a notched rack, m, and foot-lever n, substantially like that shown in Fig. 2, and locate the same at or near the center of the shaft, or at any point intermediate between its ends, whereby the shaft is braced and locked in any of its adjusted positions.

In Fig. 5 I illustrate the application of the foregoing constructions to a harrow of common form, while in Fig. 6 substantially the same mechanism is applied to a cultivator. In both cases the spiked wheels or disks and the fingers or crushing-bars are arranged in substantially the same manner as before described, they being operated and adjusted to facilitate the successful operation of the several machines to which the improvements are applied.

In like manner may the improvements described be connected with and operate in conjunction with a harrow or cultivator employing the ordinary concavo-convex disks, (see Figs. 7 and 8,) the latter displacing in this instance the spiked wheels or disks, and crushing the clods between themselves, and the fingers or crushing-bars, as before described.

In all the machines above enumerated, but especially in the case of the sharp-edged disks just described, the fingers or crushing bars enter the ground at an incline and loosen the soil adjacent to the disks and at the same time tend to hold the machine more closely to the ground, thereby accomplishing results far better than those obtained by many of the machines for similar purposes now in use.

If found desirable, a seeder may be applied to and operated in conjunction with the crusher-machine heretofore described, the fineness of the work performed by said machine making a seeder peculiarly adapted to the same.

The pole L is suitably supported and braced upon the forward part of the main frame A, and the driver's seat Q is secured at the rear of said frame and in close proximity to the end of the operating-lever H. A plate, M, secured to the rear of said frame A, is connected to a curved guard, N, which incloses the upper portions of the spiked wheels or disks, thereby obviating the danger of the operator's clothes or the driving-reins becoming entangled in the teeth during the rotary movements of said wheels.

The machine as now described embraces the active principles of a cultivator, crusher, pulverizer, and leveler, all combined in a single compact machine, easily operated and not liable to derangement. In operating the machine the teeth first enter the ground and break up the soil, the clods adhering to the teeth being carried against the fingers or bars and crushed. The series of fingers or crushing-bars are also used to pulverize the earth, when such an object is desired, and also, by reason of their all being in a line at the rear of the machine, they perform the functions of a leveler.

The series of wheels or disks may be mounted on the shaft B, to enable one or more of said series to be removed from said shaft, so as to increase the space between each of the remaining wheels, which is desirable when coarser crushing is to be accomplished. To provide for this feature I may employ devices similar to the clips or washers P. (Shown in Figs. 2 and 9.) These clips are here shown as being composed of two hinged sections adapted to encircle the shaft B, and having their free ends united by a bolt or nut. While this construction is well suited for the intended purpose, I may adopt other means, the main object being to furnish some simple mechanism that will serve as a washer or separator between the wheels or disks, and at the same time be readily applied or removed to provide for the lateral adjustment of the same.

A rod or shaft, R, (see Fig. 2,) mounted in the main frame, preferably in the rear of the fingers or crushing-bars, is provided with strippers S. These strippers may be of any desirable form, and project to within a short distance of or quite to the rear face of the crushing-fingers, and may be normally held against said bars by the action of springs T, coiled around the shaft R. It will thus be seen that the rearward and upward movement of the crushing-bars will act upon the series of spring-actuated strippers and will cause the latter to pass over the two sides of each crushing-bar, thereby cleaning the same and removing any and all material, rubbish, &c., adhering thereto.

Having thus described my present invention, what I claim as new, and desire to secure by Letters Patent, is—

1. The wheels or disks having teeth or projections thereon, and a pivoted frame having at its rear the fingers or bars, upon which the clods are crushed, in combination with an adjusting mechanism at the front of the pivoted frame for regulating the depth the fingers enter the ground, substantially as herein described.

2. The wheels or disks having the teeth or projections extending therefrom, and a pivoted frame having at its rear a series of fingers or crushing-bars, forming between their working faces and the wheels or disks an upwardly-contracting space, in combination with a double-link connection between the pivoted frame and the main frame of the machine, and a lever for operating the pivoted frame and adjusting the fingers toward or from the wheels or disks, substantially as herein described.

3. In a clod-crusher, a means for adjusting the fingers or crushing-bars with relation to the spiked wheels, comprising a pivoted frame carrying at its rear the fingers or crushing-bars, a link-connection between said frame and main frame, and a lever for depressing and elevating the rear of the pivoted frame, substantially as herein described.

4. In a clod-crusher, a pivoted frame having a series of fingers or crushing-bars mounted in its rear, and a means for adjusting said series of fingers vertically to regulate the depth they enter the ground, comprising a lever, a connection between said lever and frame, and adjusting-nuts engaging the connection and elevating or depressing the front of the frame, substantially as herein described.

5. In a clod-crusher, the frame A', having the shaft D mounted in its rear, and the fingers or crushing-bars projecting from said shaft, in combination with the crank-arms k, the links l, connected therewith, an operating-lever pivoted to the front of the frame A', and the wheels or disks having the projecting teeth, substantially as herein described.

6. In a clod-crusher, the wheels or disks mounted upon a transverse shaft and provided with the projecting teeth or spikes, in combination with the arms b, pivoted upon said shaft, a bar or rod uniting the forward ends of said arms, a transverse shaft mounted in the rear of the arms and provided with the fingers or crushing-bars, a double-joint connection between said shaft and main frame, and an operating-lever for adjusting the position of the crushing-bars, substantially as herein described.

7. In a clod-crusher, the wheels or disks mounted upon a transverse shaft and having teeth projecting therefrom, in combination with the arms b, pivoted upon said shaft, a bar or rod connecting the front ends of the arms, a shaft or bar connecting the rear ends of the same and having the fingers or crushing-bars projecting therefrom, a double-joint connection between the rear shaft and main frame, a standard or post having a stem passing through the front of the frame A', or through an arch, c, formed thereon, and adjusting the arms b and fingers or crushing-bars, a pivoted lever attached to said post and having the pawl, and a rack having notches with which the pawl engages, substantially as herein described.

8. The shaft B and the spiked wheels or disks laterally adjustable thereon, in combination with the two-part hinged clips or washers P, interposed between said wheels, and the bolts or nuts for removably securing the washers to the shaft, substantially as herein described.

9. The combination, with a crushing-machine having the spiked wheels and a series of fingers or crushing-bars adjacent to said wheels, of a series of spring-actuated strippers adjacent to and clearing the crushing-bars during the movement of the latter, substantially as herein described.

10. The combination, with a crushing-machine having spiked wheels and a series of fingers or crushing-bars, of a spring-actuated shaft in the rear of said crushing-bars, and a series of fingers or strippers projecting from said shaft and cleaning the crushing-bars, substantially as herein described.

DAVID LUBIN.

Witnesses:
T. WALTER FOWLER,
W. H. PATTERSON.